R. M. LEGGETT.
OZONIZER.
APPLICATION FILED NOV. 23, 1911.
1,037,500.
Patented Sept. 3, 1912.
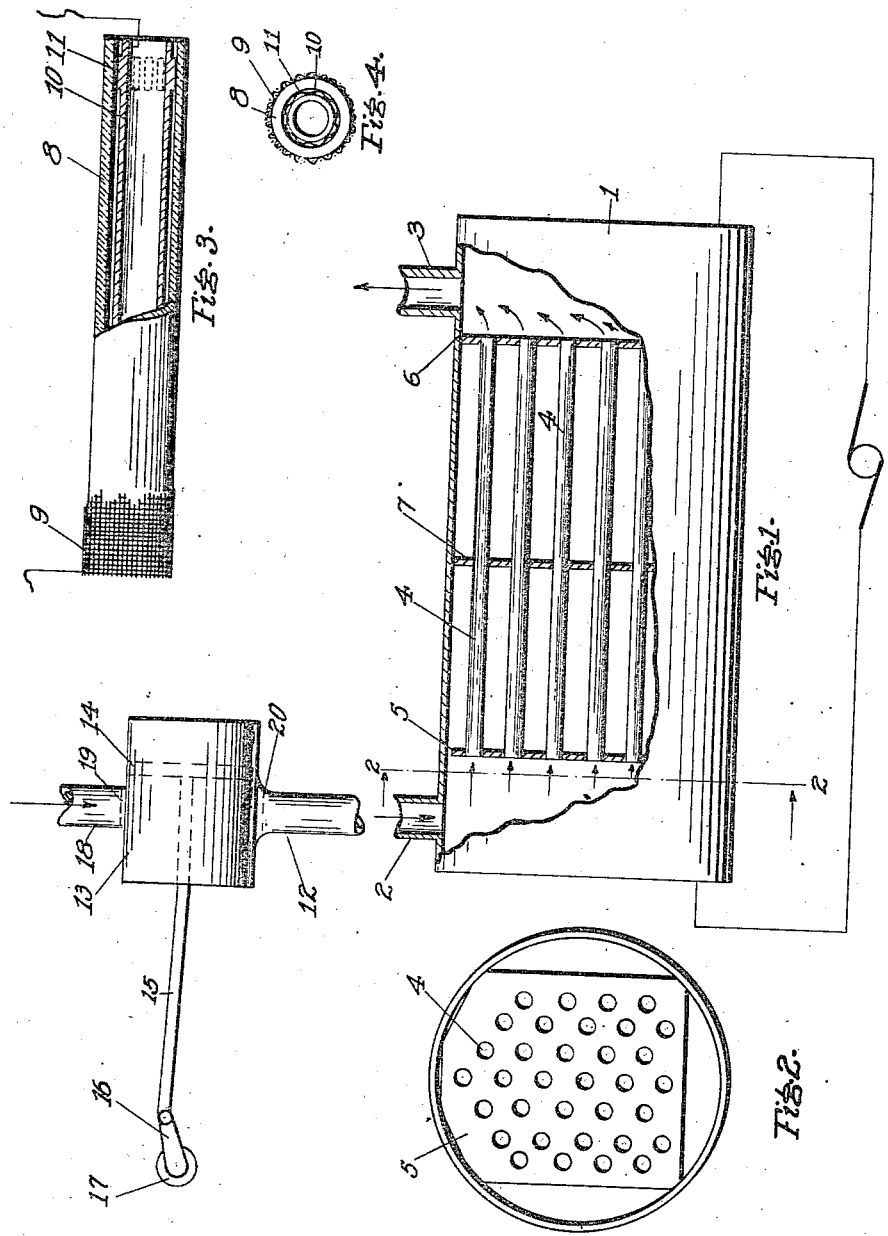
WITNESSES:
Ross M. Leggett INVENTOR
Ralgemond A. Parker ATTORNEY

UNITED STATES PATENT OFFICE.

ROSS M. LEGGETT, OF ANN ARBOR, MICHIGAN, ASSIGNOR OF ONE-FOURTH TO MICHAEL JOHN FRITZ, ONE-FOURTH TO FRANK I. CORNWELL, AND ONE-FOURTH TO TITUS F. HUTZEL, ALL OF ANN ARBOR, MICHIGAN.

OZONIZER.

1,037,500.    Specification of Letters Patent.    Patented Sept. 3, 1912.

Application filed November 23, 1911. Serial No. 661,933.

*To all whom it may concern:*

Be it known that I, ROSS M. LEGGETT, a citizen of the United States, residing at Ann Arbor, county of Washtenaw, State of Michigan, have invented a certain new and useful Improvement in Ozonizers, and declare the following to be a full, clear, and exact description of the same, such as will enable others skilled in the art to which it pertains to make and use the same, reference being had to the accompanying drawings, which form a part of this specification.

This invention relates to ozonizers, and has for its object an ozonizer which employs compressed air as a cooling element, and which is adapted to handle a maximum amount of air in a given time.

In ozonizers heretofore constructed, various means of cooling the tubes have been employed, such as refrigeration and water cooling. It has been recognized that cooling is essential to secure proper action of the apparatus, for high temperatures decompose the ozone produced into air and also have deleterious effects on the tube and electrodes. The various methods of refrigeration are expensive and not very effectual, while water cooling is defective in causing the tubes to sweat, producing moisture in the tubes, and it has been found that the tubes can rarely be surrounded by water without its seeping through in some place and flowing into the tubes where it causes sparking and the production of nitrogen gases.

I am aware that passage of air through the tubes has heretofore been accelerated by suction but this has been undesirable for the reason that it has been usually found necessary to employ refrigeration in this connection, and the ozone passing through the suction pump attacks the metal and soon disables the pump. I am also aware that fans have been employed to hasten the passage of the air through the tubes but such means does not to a great extent increase the amount of air which can be handled by the ozonizer and does not aid materially in cooling.

It is the object of my invention to provide an ozonizer which by its construction is adapted to have a minimum number of obstructions to the free passage of the air and which is adapted to handle air introduced under pressure thereby handling a greater amount of air in a given time and utilizing the increased amount of air as a cooling element.

In the drawings:—Figure 1 is an elevation of an air tank, having its wall broken away, showing a section of the ozonizer. Fig. 2 is a cross section of a tank shown in Fig. 1 taken along the line 2—2. Fig. 3 is a plan view of one of the tubes used in the ozonizer. Fig. 4, is an end view of the tube shown in Fig. 3.

An air-containing tank 1 having an air inlet 2 and an outlet 3 for the ozonized air is employed. Within this tank the ozonizer is set and comprises a plurality of tubes 4 which are supported at the ends by the frames 5 and 6. At the center of the tank a dam 7 divides the tank into two air tight compartments and also acts as a support for the ozonizer tubes. Each of these tubes comprises a dielectric which is surrounded on the outside by an electrode 9, which I prefer to construct in the form of a wire mesh. An electrode 10 is spaced from the inside of the dielectric by rings 11 pressed out of the metallic tube at each end. This presents an unobstructed passage way for the air and also eliminates bolts, nuts and other fastening means, which cannot be removed except with difficulty after having been acted upon by the ozone.

A conduit 12 connects the air inlet 2 with an air-pump cylinder 13, in which reciprocates the piston 14. Air is drawn into the cylinder through the inlet 18 which is controlled by a suitable valve 19 and then it is forced out through the conduit 12, whose opening into the cylinder is controlled by a suitable valve 20. Connecting rod 15 connects the piston 14 with a crank 16 upon the power shaft 17.

The compressed air enters the tank through the inlet 2 passing through the forward compartment where further passage, except through the tubes, is obstructed by the dam 7. The air, therefore, passes with great velocity through the tubes 4 where a large portion of it is converted into ozone by the silent discharge from the electrodes upon the dielectric. It comes through in such quantities by reason of the pressure that the temperatures of the tubes and the medium within the tubes is materially reduced thereby avoiding liability of the ozone being decomposed as fast as formed by a high temperature. After passing through the tubes 4 the ozonized air enters the rear compartment and is thence conveyed to any desired point from the outlet 3, thereby furnishing ozone under pressure, a result which has heretofore not been obtained because it has been impossible to compress ozone for the reason that the heat of compression decomposes the ozone.

What I claim is:—

1. An ozonizer, having in combination, a dielectric, electrodes thereabout adapted to furnish a silent electric discharge, means for conveying air through the silent electric discharge, a tank inclosing said electrodes and dielectric and a dam in said tank, the said tank and dam being adapted to hold air as a cooling agent about the electrodes and dielectric and means for furnishing and supplying the air to the tank, substantially as described.

2. An ozonizer, having in combination, a dielectric tube, an electrode about said tube, an electrode in said tube, the electrodes being arranged with respect to the tube so that there is a passage way through the silent electric discharge, a tank inclosing the said electrodes and tube, a dam across the tank and means for supplying air to said tank, whereby cooling of the electrodes and dielectric is effected by the air accumulating in said tank, substantially as described.

3. An ozonizer, having in combination, an air tight tank, a plurality of open-end dielectric tubes supported therein so that air may circulate about and through them, an electrode on the outside of each dielectric tube, an open-end electric on the inside of each dielectric tube and supported in spaced relation with respect to the dielectric so that air is free to travel between the inner electrode and dielectric and also through the inner electrode, a dam across said air tight tank dividing the tank into two compartments having communication only through the dielectric tubes and means for supplying air under pressure to one of the compartments of the tank, substantially as described.

In testimony whereof, I sign this specification in the presence of two witnesses.

ROSS M. LEGGETT.

Witnesses:
STUART C. BARNES,
VIRGINIA C. SPRATT.